L. G. BINKLY.
Whiffletree.
No. 74,287. Patented Feb. 11, 1868.
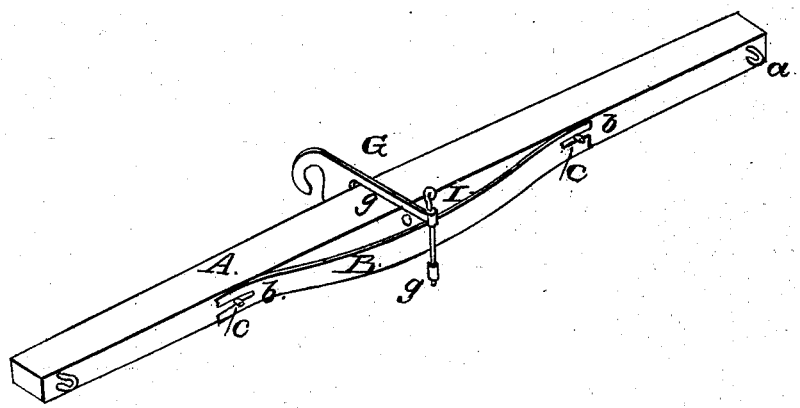

United States Patent Office.

L. G. BINKLY, OF FAIRVIEW, OHIO.

Letters Patent No. 74,287, dated February 11, 1868.

---

IMPROVEMENT IN WHIFFLE-TREE.

---

The Schedule referred to in these Letters Patent and making part of the same.

---

TO ALL WHOM IT MAY CONCERN:

Be it known that I, L. G. BINKLY, of Fairview, in the county of Wayne, and State of Ohio, have invented a new and improved Whiffle-Tree; and I do hereby declare the following to be a full, clear, and exact description of the same, sufficient to enable those skilled in the art to which my invention appertains to make use of it, reference being had to the accompanying drawing, forming part of this specification, in which the drawing is a perspective view.

This improvement consists in attaching the whiffle-tree to a spring, which supports it, and allows it to yield, to a certain extent, when any sudden force is brought to bear upon it, thereby preventing it from being broken, as well as rendering its action easier for the horse, and imparting a steadier motion to the carriage.

In the drawings, A represents an ordinary whiffle-tree, having hooks $a\ a$, to which to attach the traces. On the forward side of this whiffle-tree is a spring, B, of the form shown in the drawing, supported in position and guided in its operation by an arm or lug, $e$, and by pins, $c\ c$, operating in slots or gains, $b\ b$, at each end of the spring. The object of thus constructing, attaching, and supporting the spring is to allow it perfect freedom of action, while, at the same time, holding it steady, and preventing its twisting or breaking. The spring having thus been attached to the whiffle-tree, the latter is connected with the carriage by a hooked coupling, G. The whiffle-tree passes through the forward end of this coupling, the latter being made with arms $g\ g$, between which the whiffle-tree is held. A bolt, I, connects the arms at their forward ends, passing through a hole in the lug $e$, as shown in the drawing.

As the whiffle-tree is drawn forward, the bolt I presses against the centre of the spring, which at this point sustains the entire draught of the carriage. When the carriage comes in contact with any obstacle which arrests its motion suddenly, the force of the shock will be taken upon the spring B, thereby saving the carriage or harness from being broken, and rendering the action much easier for the horse. It will be especially valuable for use in connection with ploughs, which are frequently coming in sudden contact with rocks and other obstacles.

I am aware that a whiffle-tree has been heretofore constructed and used, in which the same general result is sought to be attained. In that invention the traces are each attached to a spring, which extends the entire length of the whiffle-tree. The difference between my invention and the one referred to, and the advantages of mine over that one, will be obvious at a glance. In mine, the traces are not attached to the spring, but to the whiffle-tree, as in other cases.

In my invention a short spring can be used, to which any degree of strength and rigidity can be imparted without rendering it cumbersome and unwieldy, while this cannot be done in the case of the other invention. The whole device is simpler, cheaper, and less liable to get out of order than the one referred to, besides acting more efficiently when in order.

Having thus described my invention, what I claim as new, and desire to secure by Letters Patent, is—

A whiffle-tree, constructed of a single bar, A, sliding forward and backward in a socket or coupling, G, and operating against a spring, B, arranged in front of it, substantially as and for the purpose set forth.

L. G. BINKLY.

Witnesses:
   S. A. WYLIE,
   J. G. WOLFERSBERGER.